US012798246B2

(12) United States Patent
Ito

(10) Patent No.: US 12,798,246 B2
(45) Date of Patent: Nov. 17, 2026

(54) INK-JET RECORDING APPARATUS

(71) Applicant: KYOCERA Document Solutions Inc., Osaka (JP)

(72) Inventor: Shigeharu Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 183 days.

(21) Appl. No.: 18/713,855

(22) PCT Filed: Nov. 24, 2022

(86) PCT No.: PCT/JP2022/043342
§ 371 (c)(1),
(2) Date: May 28, 2024

(87) PCT Pub. No.: WO2023/100738
PCT Pub. Date: Jun. 8, 2023

(65) Prior Publication Data

US 2024/0351336 A1 Oct. 24, 2024

(30) Foreign Application Priority Data

Nov. 30, 2021 (JP) ................................ 2021-193973

(51) Int. Cl.
*B41J 2/165* (2006.01)

(52) U.S. Cl.
CPC ........... *B41J 2/16511* (2013.01); *B41J 2/165* (2013.01); *B41J 2/16502* (2024.05); *B41J 2/16505* (2013.01); *B41J 2/16508* (2013.01); *B41J 2/16514* (2024.05)

(58) Field of Classification Search
CPC .... B41J 2/16511; B41J 2/165; B41J 2/16502; B41J 2/16505; B41J 2/16508; B41J 2/16514
See application file for complete search history.

(56) References Cited

U.S. PATENT DOCUMENTS 5,341,163 A * 8/1994 Hanabusa ............ B41J 2/16511 347/30
2014/0210903 A1 7/2014 Tanda ............................ 347/29

FOREIGN PATENT DOCUMENTS

JP 2014-000679 A 1/2014
JP 2014-144585 A 8/2014

OTHER PUBLICATIONS

Office Action mailed Mar. 11, 2025, issued to corresponding Japanese Application No. 2023-564917.

* cited by examiner

*Primary Examiner* — Geoffrey S Mruk
(74) *Attorney, Agent, or Firm* — Stein IP, LLC

(57) ABSTRACT

An ink-jet recording apparatus (100) includes a conveying portion (4*a*, 5, 12), a recording head (17*a* to 17*c*), a cap member (30), a cap moving mechanism (65, 66), a control portion (110), a fault detection portion (110*e*), and a storage portion (28). With the cap moving mechanism (65, 66), the cap member (30) is movable between a first position and a second position. The fault detection portion (110*e*) can detect a movement inhibiting factor. The storage portion (28) can store fault information including the movement inhibiting factor. The control portion (110) can execute a measurement mode in which, based on the detection result from the fault detection portion (110*e*), the fault information is stored in the storage portion (28).

7 Claims, 11 Drawing Sheets

INK-JET RECORDING APPARATUS

CROSS-REFERENCE TO RELATED APPLICATIONS

This application is a national stage of International Application No. PCT/JP2022/043342, filed Nov. 24, 2022, which claims the benefit of Japanese Application No. 2021-193973, filed Nov. 30, 2021, in the Japanese Patent Office, the disclosures of which are incorporated herein by reference.

TECHNICAL FIELD

The present invention relates to an ink-jet recording apparatus.

BACKGROUND ART

As recording apparatuses such as facsimile machines, copiers, and printers, ink-jet recording apparatuses, which form images by ejecting ink on recording media such as sheets and OHP sheets, are widely used for their ability to form high-definition images.

In such ink-jet recording apparatuses, when the solvent in ink inside ink ejection nozzles in a recording head evaporates, the ink concentrates, and this can lead to clogging in ink ejection apertures at the tip of the ink ejection nozzles. Thus, some ink-jet recording apparatuses include a cap for capping the ink ejection apertures to prevent the solvent in ink inside the ink ejection nozzles from evaporating (Patent Document 1).

The ink-jet recording apparatus of Patent Document 1 includes a rubber cap, a cap moving mechanism for moving the cap, and a control portion for controlling the cap moving mechanism. The cap has an annular rib that projects from a circumferential part of the main body. The cap moving mechanism can move the cap between a first position at which the cap is away from the ink ejection face and a second position at which the cap is attached to the ink ejection face. The cap moving mechanism keeps the annular rib of the cap in pressed contact with the ink ejection face of the recording head to prevent dehydration in the ink ejection apertures located inward of the annular rib. The control portion controls the cap moving mechanism so that, when a predetermined time passes after previous ink ejection from the ink ejection face before subsequent ink ejection, the cap is moved from the first position to the second position.

In the ink-jet recording apparatus of Patent Document 1, in order to prevent ink ejection failure due to dehydration or clogging in the recording head, purging is performed by pushing ink with high viscosity in the nozzles out of the ejection nozzles in the recording head at the start of printing after a long out-of-operation period or during intermissions of printing. Purging is performed also when ink ejection apertures clog so as to clear the clog by forcibly pushing ink out of the ejection nozzles.

CITATION LIST

Patent Literature

Patent Document 1: Japanese Patent Application published as No. 2014-144585.

SUMMARY OF INVENTION

Technical Problem

In the ink-jet recording apparatuses like the one described above, there are cases where, at the time when the cap is supposed to be attached to the ejecting nozzles, the cap cannot be attached due to various faults. In this case, the time for which ink ejection apertures are open is longer than usual, and the ink in the ink ejection apertures dries more easily. This results in an increased frequency of purging described above, leading to a drop in productivity in the form of, for example, delay in printing and an increase in ink consumption for purging.

Thus, the present invention is aimed at providing an ink-jet recording apparatus that can suppress a drop in productivity.

Solution to Problem

To achieve the above object, an ink-jet recording apparatus according to a first aspect of the present invention includes a conveying portion, a recording head, a cap member, a cap moving mechanism, and a control portion. The conveying portion conveys a recording medium. The recording head has an ink ejection face from which ink is ejected and ejects ink from the ink ejection face to the recording medium conveyed by the conveying portion to perform printing. The cap member is removably attached to the ink ejection face and protects the ink ejection face. With the cap moving mechanism, the cap member is movable between the first position at which the cap member is away from the ink ejection face and the second position at which the cap member is attached to the ink ejection face. The control portion controls the cap moving mechanism so that, at a cap closing timing that occurs a predetermined time after previous ink ejection from the ink ejection face before subsequent ink ejection, the cap member is moved from the first position to the second position. The ink-jet recording apparatus further includes a fault detection portion that can detect occurrence of a movement inhibiting factor that inhibits the movement of the cap member to the second position and a storage portion that can store fault information including the movement inhibiting factor. The control portion can execute a measurement mode in which, based on the detection result from the fault detection portion, the fault information is stored in the storage portion.

Advantageous Effects of Invention

According to a first aspect of the present invention, it is possible to detect occurrence of a movement inhibiting factor for a cap member and store fault information in a storage portion. A user can, based on the fault information stored in the fault storage portion, perform maintenance of the ink-jet recording apparatus or review the operation sequence and print settings on the ink-jet recording apparatus. In this way, it is possible to suppress occurrence of the movement inhibiting factor and reduce the frequency of execution of purging. Thus, it is possible to provide an ink-jet recording apparatus that can suppress a drop in productivity.

DESCRIPTION OF EMBODIMENTS

Figure 1:
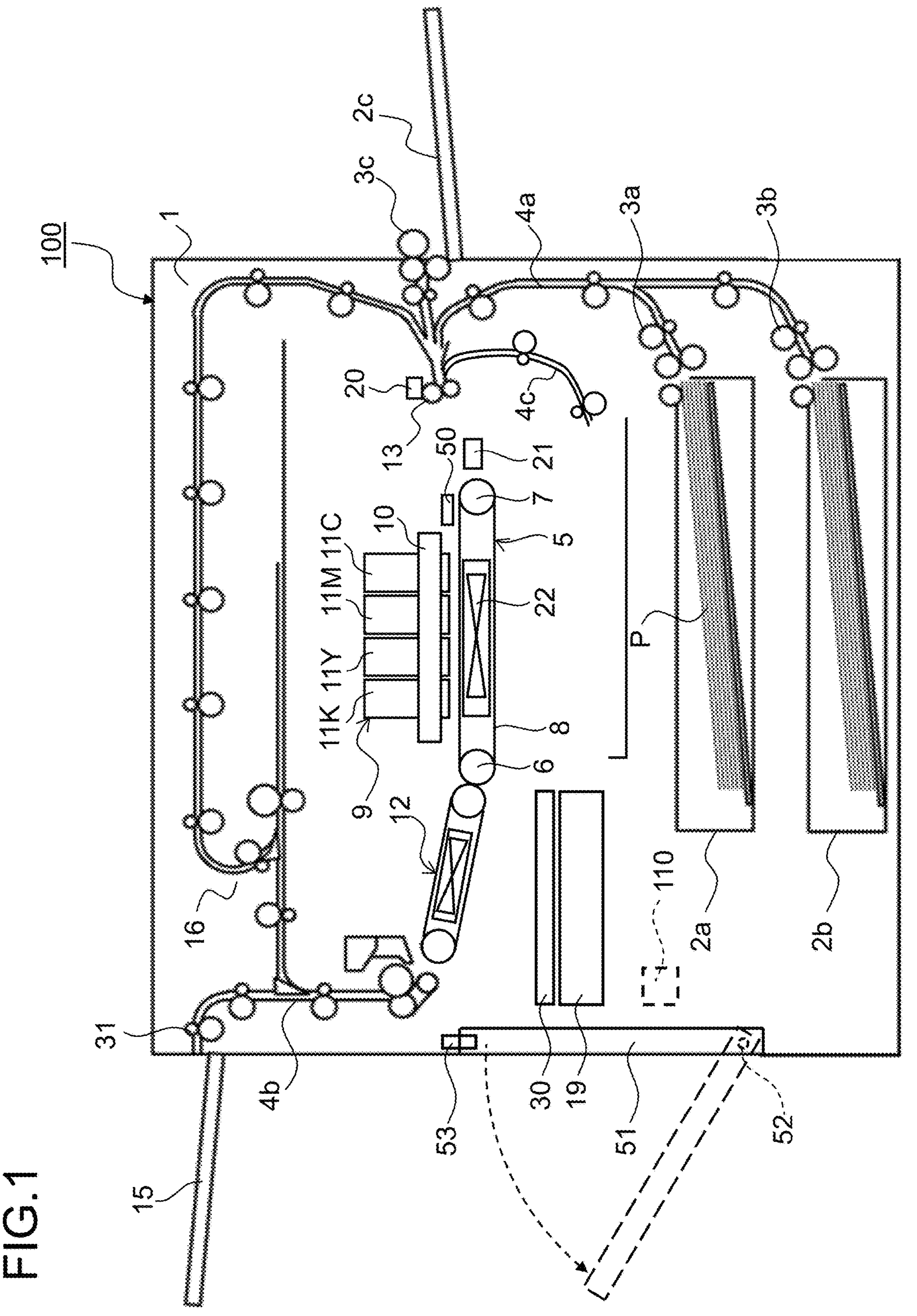
FIG. 1 is a diagram illustrating an outline of the construction of a printer 100 of an ink-jet recording type according to one embodiment of the present disclosure.

With reference to the accompanying drawings, embodiments of the present invention will be described below. FIG. 1 is a diagram illustrating an outline of the construction of a printer 100 of an ink-jet recording type (ink-jet recording apparatus) according to one embodiment of the present disclosure.

As shown in FIG. 1, the printer 100 includes sheet feeding cassettes 2*a* and 2*b* and a manual feed tray 2*c*. In the sheet feeding cassettes 2*a* and 2*b*, sheets P (of a recording medium, such as printing sheets and envelopes) can be stored. The sheet feeding cassettes 2*a* and 2*b* are arranged in a lower part inside a printer main body 1 (apparatus main body). On the top face of the manual feed tray 2*c*, sheets P can be stacked. The manual feed tray 2*c* is provided on the right side face of the printer main body 1, outside it. Hereinafter, the direction (arrow A direction in the drawings) in which the sheet P is conveyed from the sheet feeding cassettes 2*a* or 2*b* or from the manual feed tray 2*c* is referred to as the "sheet conveying direction". The direction (arrow C-C' direction in the drawings) perpendicular to the sheet conveying direction and perpendicular to the up-down direction (arrow B-B' direction in the drawings) is referred to as the "sheet width direction".

On the downstream side of the sheet feeding cassettes 2*a* and 2*b* in the sheet conveying direction, that is, to the upper right of the sheet feeding cassettes 2*a* and 2*b* in FIG. 1, sheet feeding devices 3*a* and 3*b* are respectively arranged. On the downstream side of the manual feed tray 2*c* in the sheet conveying direction, that is, to the left of the manual feed tray 2*c* in FIG. 1, a sheet feeding device 3*c* is arranged. The sheet feeding devices 3*a* to 3*c* separate sheets (recording medium) P and feed them out one after another.

On the side face of the printer main body 1, a main body cover 51 is provided. The main body cover 51 is supported on the printer main body 1 so as to be pivotable about a rotary shaft 52 provided at one end (here, the bottom end) of the cover 51 in the up-down or horizontal direction. Pivoting the main body cover 51 in a direction away from the main body cover 51 exposes the inside of the printer main body 1. In this state, a user can access different devices provided in the printer main body 1 (such as a maintenance unit 19, a recording portion 9, and the like, which will be described later). A plurality of main body covers 51 can be provided at different places in the printer main body 1.

Around the main body cover 51, a cover open/closed detection sensor 53 is provided. The cover open/closed detection sensor 53 is a sensor that can sense the open/closed state of the main body cover 51. As the cover open/closed detection sensor 53, a photo sensor of an optical type can be used. In that case, the cover open/closed detection sensor 53 includes a light receiving portion and a light emitting portion (neither is shown). The cover open/closed detection sensor 53 receives at the light receiving portion a light beam emitted from the light emitting portion. Based on how the light is received, the cover open/closed detection sensor 53 can sense the open/closed state of the main body cover 51.

Inside the printer 100, a first sheet conveying passage 4*a* (conveying portion) is provided. An upstream-side end part of the first sheet conveying passage 4*a* in the sheet conveying direction is, via the sheet feeding devices 3*a* and 3*b*, connected to the sheet feeding cassettes 2*a* and 2*b*. The first sheet conveying passage 4*a* extends from its upstream-side end part in the sheet conveying direction upward along the side face of the printer main body 1. The manual feed tray 2*c* is connected to the first sheet conveying passage 4*a* via the sheet feeding device 3*c*. The sheet feeding devices 3*a* and 3*b* feed sheets P from the sheet feeding cassettes 2*a* and 2*b* to the first sheet conveying passage 4*a*. The sheet feeding device 3*c* feeds sheets P from the manual feed tray 2*c* to the first sheet conveying passage 4*a*.

In a downstream-side end part of the first sheet conveying passage 4*a* in the sheet conveying direction, a pair of registration rollers 13 is provided. On the downstream side of the pair of registration rollers 13, close to it, there are arranged a first belt conveying portion (conveying portion) 5 and the recording portion 9. The pair of registration rollers 13, while correcting skewed conveying of sheets P and coordinating with the timing of ink ejecting operation by the recording portion 9, feeds out the sheets P toward the first belt conveying portion 5.

On the upstream side of the pair of registration rollers 13, close to it, there is arranged a pre-registration sensor 20 that senses a sheet P fed out from the sheet feeding cassette 2*a* or the manual feed tray 2*c*. Between the pair of registration rollers 13 and the first belt conveying portion 5, a CIS (contact image sensor) 21 for sensing the positions of end parts of the sheet P in the width direction (the direction perpendicular to the sheet conveying direction) is arranged.

The first belt conveying portion 5 includes a first conveying belt 8, a driving roller 6, and a driven roller 7. The first conveying belt 8 is an endless belt. The driving roller 6 and the driven roller 7 are arrayed on the inner side of the first conveying belt 8, parallel in the sheet conveying direction. The first conveying belt 8 is wound around the driving roller 6 and the driven roller 7. The inner circumferential face of the first conveying belt 8 makes contact with the outer circumferential face of the driving roller 6. As the driving roller 6 rotates, the first conveying belt 8 rotates by following it.

In the inner side of the first conveying belt 8, opposite the reverse side of the conveying face of the first conveying belt 8, a sheet sucking portion 22 is provided. The sheet sucking portion 22 has a plurality of holes (unillustrated) in its top face for sucking air and has a fan inside it, so that air can be sucked in from the top face downward. Also in the first conveying belt 8, a number of vent holes (unillustrated) for sucking in air are provided. With the structure described above, a sheet P fed out from the pair of registration rollers 13, while being held by suction on the conveying face of the conveying belt, passes under the recording portion 9.

Around the recording portion 9, the sheet detection sensor 50 (recording medium detection sensor) is arranged. The sheet detection sensor 50 can sense whether a sheet P is present or not between the recording portion 9 and the first conveying belt 8 (at a position where the sheet P faces the recording portion 9 in the up-down direction). When printing is interrupted, based on the detection result from the sheet detection sensor 50, it is possible to judge whether a sheet P is causing a sheet jam between the recording portion 9 and the first conveying belt 8.

On the downstream side (left side in FIG. 1) of the first belt conveying portion 5 in the sheet conveying direction, a second belt conveying portion 12 (conveying portion) is arranged. A sheet P having an image recorded on it at the recording portion 9 is conveyed to the second belt conveying portion 12 and, while the sheet P passes through the second belt conveying portion 12, the ink ejected on the surface of the sheet P is dried. The structure of the second belt conveying portion 12 is similar to that of the first belt conveying portion 5.

On the downstream side of the second belt conveying portion 12 in the sheet conveying direction, a second sheet conveying passage **4*b* (conveying portion) is provided. At a downstream-side end part of the second sheet conveying passage 4*b* in the sheet conveying direction, a pair of discharge rollers 31 for discharging sheets P out of the printer main body 1 is provided. A sheet P that has passed through the second belt conveying portion 12 is, when not subjected to duplex recording, discharged through the second sheet conveying passage 4*b* via the pair of discharge rollers 31 onto a sheet discharge tray 15 provided on the left side face of the printer 100, outside it. When recording is performed on both sides of a sheet P, the sheet P having undergone recording on its first side and having passed through the second belt conveying portion 12 is conveyed through the second sheet conveying passage 4*b* to a reversing conveying passage 16. The sheet P conveyed to the reversing conveying passage 16 has its conveying direction switched so as to be reversed between its obverse and reverse sides, and is conveyed to the pair of registration rollers 13 via an upper part of the printer 100. Then, with the face on which no image has been recorded yet pointing up, the sheet P is conveyed to the first belt conveying portion 5** again.

Under the second belt conveying portion 12, a maintenance unit 19 and a cap unit 30 (cap member) are arranged. The maintenance unit 19, when it performs purging, which will be described later, horizontally moves to under the recording portion 9 where it wipes off the ink pushed out of ejection nozzles (see FIG. 2) in recording heads **17*a* to 17*c* and collects the wiped-off ink. The cap unit 30, when it caps the ink ejection face F (see FIG. 4) of the recording heads 17*a* to 17*c*, horizontally moves to under the recording portion 9, and then moves upward to be attached to the bottom face of the recording heads 17*a* to 17*c***.

Figure 2:
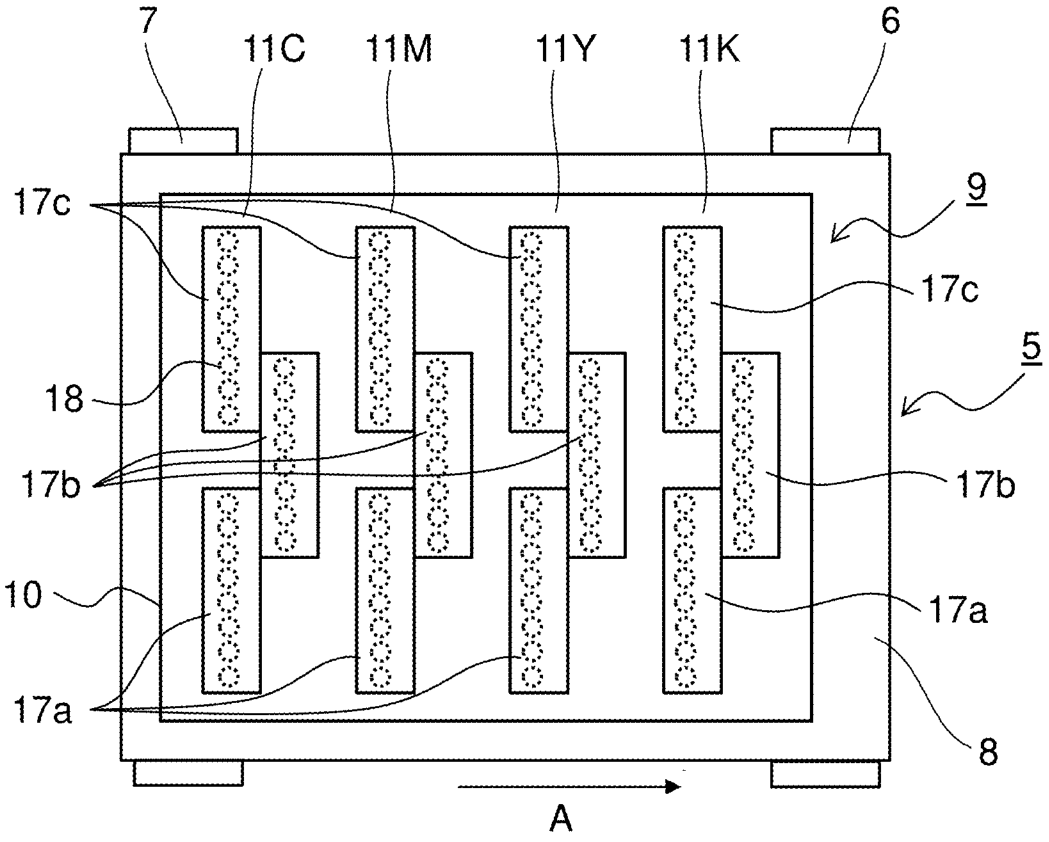
FIG. 2 is a diagram of a first belt conveying portion 5 and a recording portion 9 in the printer 100 as seen from above.
Figure 3:
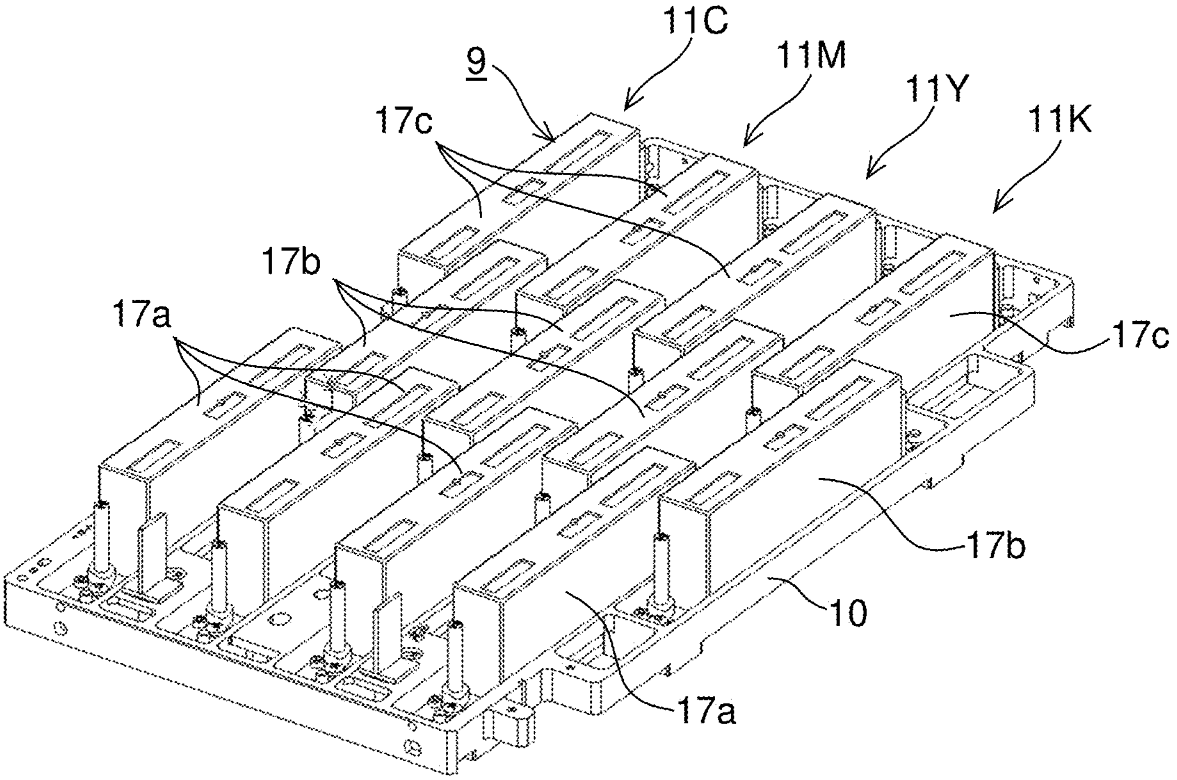
FIG. 3 is a diagram showing the structure of the recording portion 9 in the printer 100.
Figure 4:
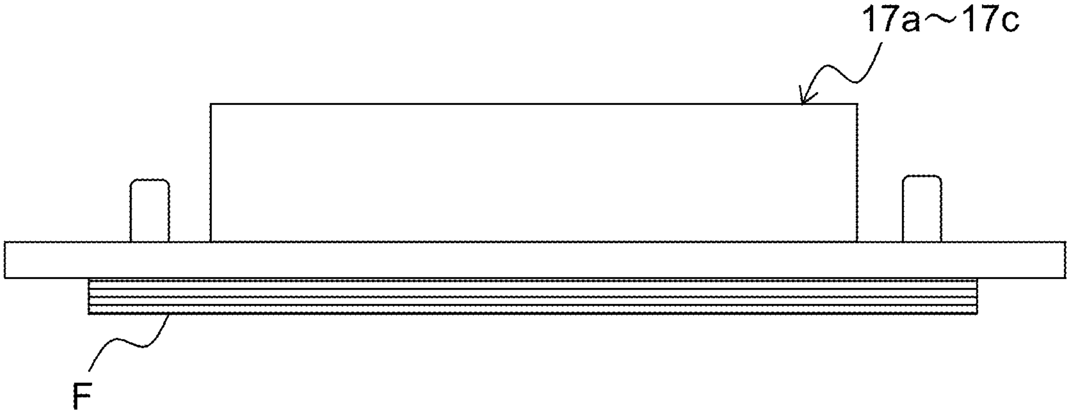
FIG. 4 is a diagram showing the structure of recording heads 17*a* to 17*c* constituting line heads 11C to 11K in the recording portion 9 in the printer 100.

FIG. 2 is a diagram showing the first belt conveying portion 5 and the recording portion 9 in the printer 100 as seen from above. FIG. 3 is a diagram showing the structure of the recording portion 9 in the printer 100. FIG. 4 is a diagram showing the structure of the recording heads **17*a* to 17*c* constituting line heads 11C to 11K in the recording portion 9 in the printer 100**.

The recording portion 9 includes, as shown in FIGS. 1 to 4, a head housing 10, and line heads 11C, 11M, 11Y and 11K held on the head housing 10. The line heads 11C to 11K are held at such a height that a predetermined gap (i.e. 1 mm) is formed with respect to the conveying face of the first conveying belt 8, which is stretched around a plurality of rollers including the driving roller 6 and the driven roller 7, and along the sheet width direction (up-down direction in FIG. 2), a plurality of (here, three) recording heads **17*a* to 17*c* are arrayed in a staggered manner. The line heads 11C to 11K have a recording region larger than the width of the conveyed sheet P and eject water-based ink (hereinafter, referred to simply as ink) through ejection nozzles 18 corresponding to the printing position to a sheet P conveyed by the first conveying belt 8**.

Figure 5:
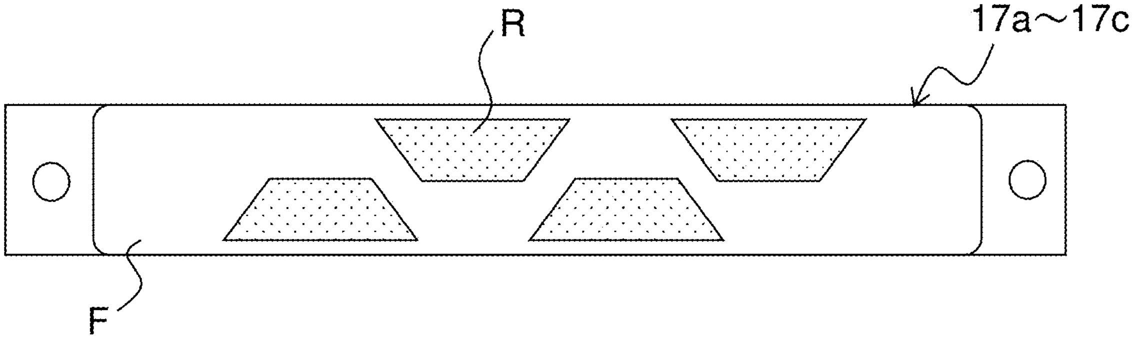
FIG. 5 is a diagram of the recording heads 17*a* to 17*c* in the printer 100 as seen from the ink ejection face F side.

FIG. 5 is a diagram of the recording heads **17*a* to 17*c* in the printer 100 as seen from the ink ejection face F side. As shown in FIG. 5, the ink ejection face F of the recording heads 17*a* to 17*c* has a nozzle region R formed on it. In the nozzle region R, a number of openings, which are tip ends of the ejection nozzles 18 (see FIG. 2), are arrayed (unillustrated). In the ink ejection face F, a water-repellent film (unillustrated) is formed. Since the recording heads 17*a* to 17*c* have the same shape and structure, FIGS. 4 and 5 each show only one of the recording heads 17*a* to 17*c***.

To the recording heads **17*a* to 17*c* constituting the line heads 11C to 11K, ink of four colors (cyan, magenta, yellow, and black) stored in ink tanks (unillustrated) is supplied, ink of different colors being supplied to corresponding one of the line heads 11C to 11**K respectively.

Based on image data received from an external computer or the like, the recording heads **17*a* to 17*c* eject ink from the ejection nozzles 18 (see FIG. 2) toward the sheet P, which is conveyed while being held by absorption on the conveying face of the first conveying belt 8. With this, on the sheet P on the first conveying belt 8**, there is formed a color image having ink of four colors, namely cyan, magenta, yellow and black, overlaid together.

In order to prevent ink ejection failure due to dehydration or clogging in the recording heads **17*a* to 17*c*, purging is performed by pushing ink with high viscosity in the nozzles out of, at the start of printing after a long out-of-operation period, all the ejection nozzles 18 (see FIG. 2) in the recording heads 17*a* to 17*c*, or, during intermissions of printing, ejection nozzles 18 in the recording heads 17*a* to 17*c*** with an ink ejection amount lower than a prescribed value, in preparation for subsequent printing operation.

In addition, in order to prevent ink ejection failure due to dehydration or clogging in the recording heads **17*a* to 17*c*, the cap unit 30 can be attached to them. The cap unit 30 is coupled to a unit horizontal-movement mechanism 65 (cap moving mechanism) and a unit ascent/descent mechanism 66 (cap moving mechanism). The unit horizontal-movement mechanism 65 and the unit ascent/descent mechanism 66 move the cap unit 30 in the horizontal direction (here, the direction along the sheet conveying direction) and in the up-down direction, and thereby move the cap unit 30 between a first position where cap portions 30*b*, described later, are away from the ink ejection faces F of the recording heads 17***a* to 17*c* and a second position where the cap portions 30*b* are attached to the ink ejection face F.

Figure 6:
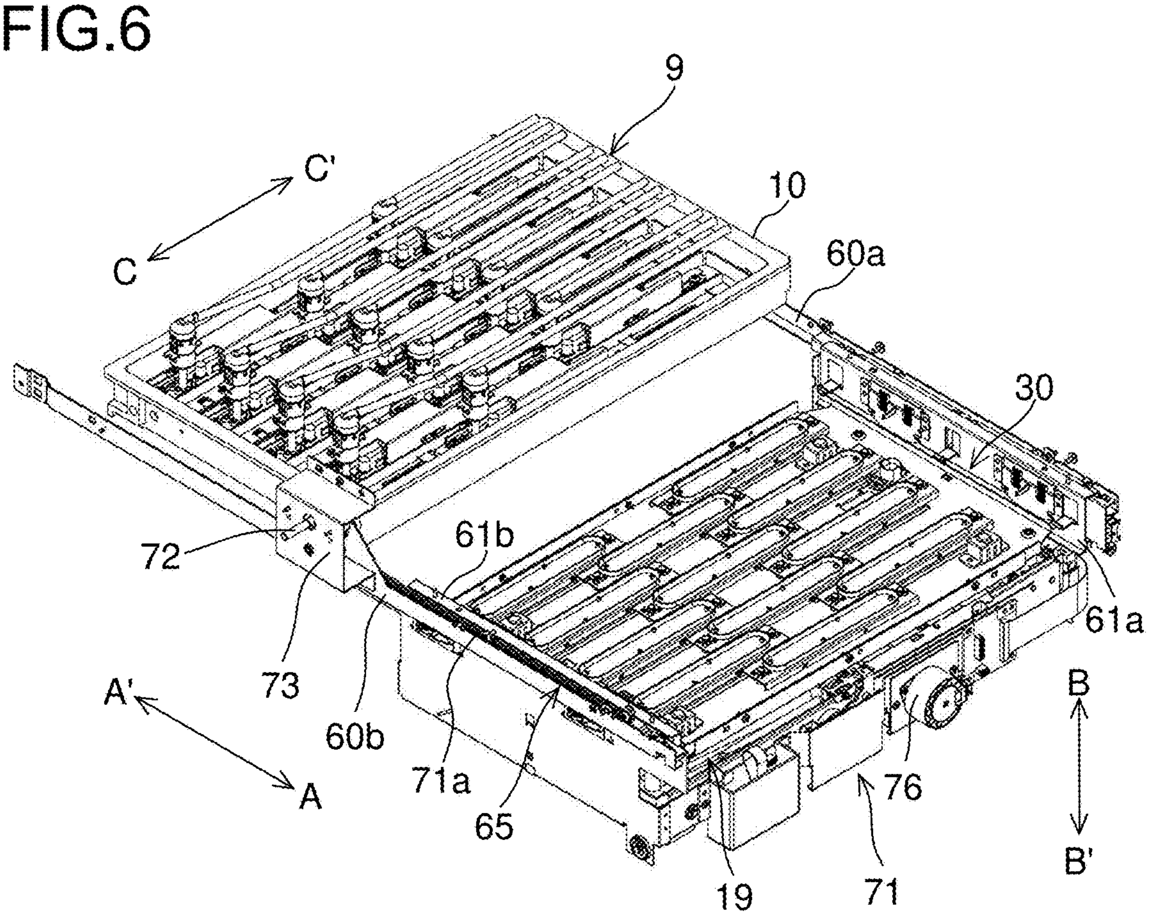
FIG. 6 is a diagram showing the structure of the recording portion 9, a cap unit 30, a maintenance unit 19, and the like in the printer 100.
Figure 7:
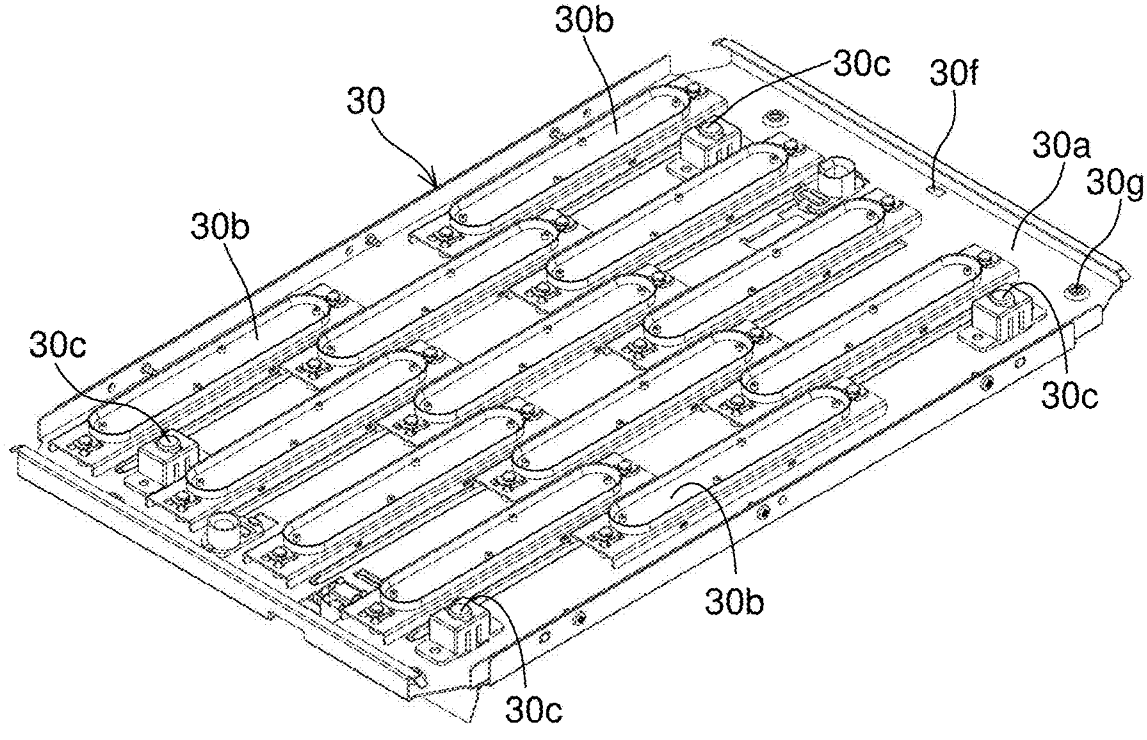
FIG. 7 is a diagram showing the structure of the cap unit 30 in the printer 100.
Figure 8:
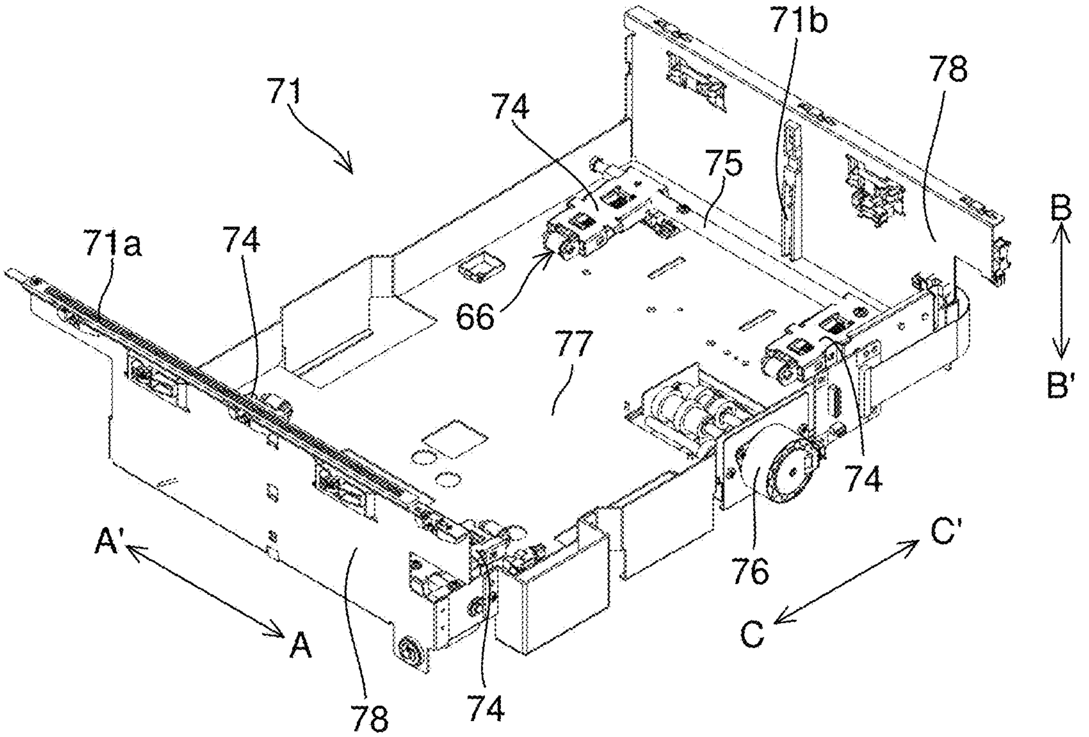
FIG. 8 is a perspective view of the structure of a carriage 71 in the printer 100, showing a state where support arms 74 are collapsed.
Figure 9:
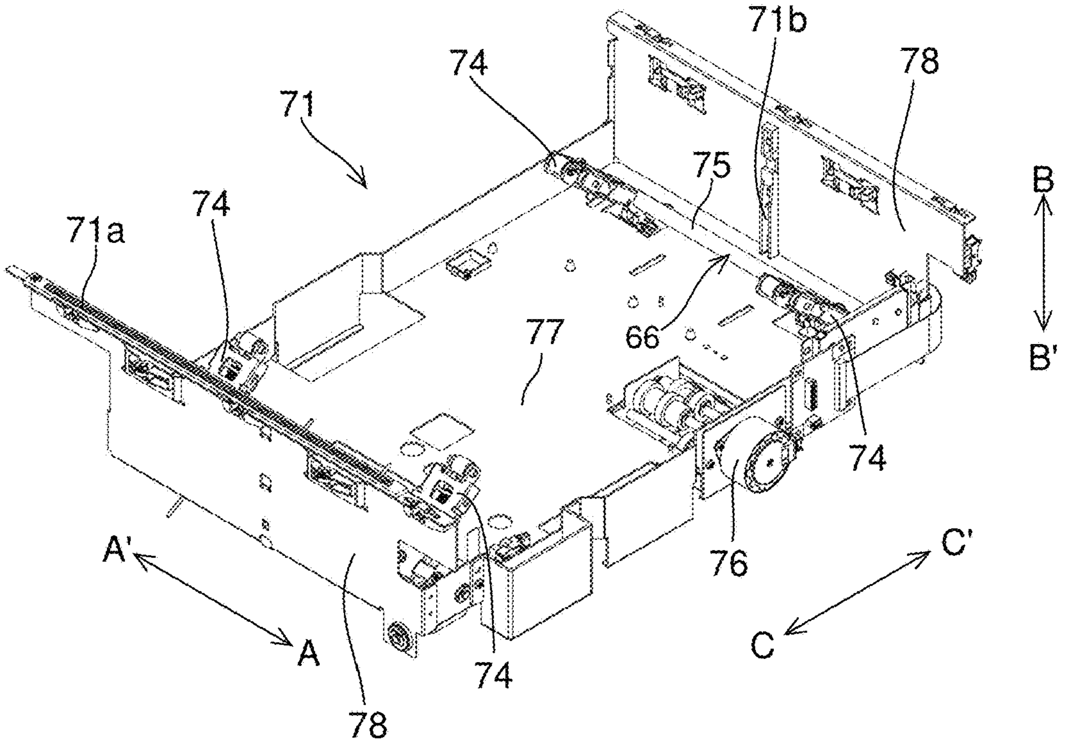
FIG. 9 is a perspective view of the structure of the carriage 71 in the printer 100, showing a state where support arms 74 are raised.

FIG. 6 is a diagram showing the structure of the recording portion 9, the cap unit 30, the maintenance unit 19, and the like in the printer 100. FIG. 7 is a diagram showing the structure of the cap unit 30 in the printer 100. FIGS. 8 and 9 are perspective views showing the structure of a carriage 71 in the printer 100. FIG. 8 shows a state where support arms 74 are collapsed, and FIG. 9 shows a state where the support arms 74 are raised.

As shown in FIGS. 6 and 7, the cap unit 30 includes a cap tray 30*a*, the cap portions 30*b*, and height-direction positioning projections 30*c*. The cap tray 30*a* is a plate-form member in a rectangular shape made of sheet metal.

The cap portions 30*b* are arranged on the top face of the cap tray 30*a*, at positions corresponding to the arrangement (staggered arrangement) of the recording heads 17*a* to 17*c*. The cap portions 30*b* are formed as recesses so that, when the recording heads 17*a* to 17*c* are attached, the ink ejection faces F fit in the cap portions 30*b*. When the cap portions 30*b* are attached to the recording heads 17*a* to 17*c*, the ink ejection faces F make contact with the bottom faces of the cap portions 30*b*. Four height-direction positioning projections 30*c* are provided on the top face of the cap tray 30*a*.

The cap unit 30 can, by the action of the unit horizontal-movement mechanism 65, reciprocate between a facing position (the position in FIG. 12), where the cap unit 30 is right under the recording portion 9 so as to face the recording portion 9 in the up-down direction, and a retracted position (the position in FIG. 6), where the cap unit 30 is retracted from the facing position in the horizontal direction (arrow A direction). The cap unit 30 can, by the action of the unit ascent/descent mechanism 66, reciprocate between the facing position (a first position) described above and a contact position (a second position), where the bottom faces of the cap portions 30*b* make contact with the ink ejection faces F of the recording heads 17*a* to 17*c*. The cap portions 30*b* are attached so as to remain in contact with the recording heads 17*a* to 17*c* to cap (seal) the recording heads 17*a* to 17*c*.

When the cap unit 30 in the facing position described above is raised toward the recording portion 9 to cap the recording heads 17*a* to 17*c*, the tip ends of the height-direction positioning projections 30*c* make contact with the head housing 10 in the recording portion 9 at a predetermined height. The contact between the height-direction positioning projections 30*c* and the head housing 10 restricts the upward movement of the cap unit 30 to keep constant the state of contact between the cap portions 30*b* and the ink ejection face F.

As shown in FIG. 6, the unit horizontal-movement mechanism 65 is provided under the recording portion 9. The unit horizontal-movement mechanism 65 has guide rails 60*a* and 60*b*, guide plates 61*a* and 61*b*, and a drive motor 72. The guide rails 60*a* and 60*b* are arranged under the recording portion 9 so as to be parallel to the sheet conveying direction (arrow A direction), along opposite ends of the recording portion 9 in the sheet width direction (arrow C-C' direction). The guide plates 61*a* and 61*b* are fixed to bottom end parts of the guide rails 60*a* and 60*b*. On the bottom end parts of the guide plates 61*a* and 61*b*, the side edges of the cap unit 30 are supported.

The guide rails 60*a* and 60*b* support the carriage 71 such that this is slidable in the sheet conveying direction. As shown in FIGS. 8 and 9, the carriage 71 is in the shape of a box composed of a bottom face 77 and a pair of side walls 78. The pair of side walls 78 are formed so as to rise upward from opposite edges of the bottom face 77 in the sheet width direction. The pair of side walls 78 face each other in the sheet width direction. The maintenance unit 19 is placed on the bottom face 77 of the carriage 71 (see FIG. 6). One (here, the arrow C side one) of the pair of side walls 78 has, on a top end part of it, rack teeth 71*a* formed which extend in the sheet conveying direction.

Back in FIG. 6, the drive motor 72 is arranged outward of (on the arrow C side of) the guide rail 60*b* in the sheet width direction. The drive motor 72 includes a cover member 73 and a gear train (not shown). The cover member 73 is provided so as to cover the drive motor 72. The gear train is composed of an output shaft (not shown) of the drive motor 72 and a plurality of gears (not shown) that mesh with the output shaft. The gear train is arranged so as to mesh with the rack teeth 71*a*. The gear train transmits the rotative driving force of the drive motor 72 to the carriage 71 via the rack teeth 71*a*. The rotative driving force of the drive motor 72 is transmitted, by a cam mechanism constituted by the gear train and the rack teeth 71*a*, to the carriage 71 as a driving force along the sheet conveying direction. That is, when the drive motor 72 rotates forward, the gear train rotates, and the maintenance unit 19 moves along with the carriage 71 one way (here, in the arrow A' direction) along the sheet conveying direction. By contrast, when the drive motor 72 rotates reversely, the maintenance unit 19 moves along with the carriage 71 the other way (here, in the arrow A direction) along the sheet conveying directions.

The maintenance unit 19 (carriage 71) can reciprocate between a facing position (the position in FIG. 12, a first position), where the maintenance unit 19 is right under the recording portion 9 so as to face it in the up-down direction, and a retracted position (the position in FIG. 6), where the maintenance unit 19 is retracted from the facing position in the horizontal direction (here, in the sheet conveying direction). The maintenance unit 19 is configured to, in the facing position, move upward to perform wiping (operation of wiping ink that has been discharged onto the ink ejection face F).

The maintenance unit 19 (carriage 71) can reciprocate together with or separately from the cap unit 30. The carriage 71 and the cap unit 30 may be configured to have an engagement mechanism (not shown) with the help of which, when they move together, the carriage 71 is engaged with the cap unit 30 and, when they move separately, the carriage 71 is disengaged from the cap unit 30.

As shown in FIGS. 8 and 9, the unit ascent/descent mechanism 66 is configured to have the support arms 74, a wipe ascent/descent motor 76, rotary shafts 75, and a guide groove 71*b*. The support arms 74 are provided in the four corners of the carriage 71. The support arms 74 support the maintenance unit 19 from its bottom face side and can swing (rise or collapse). The support arms 74 adjacent in the sheet conveying direction (arrow A-A' direction) are coupled together via the rotary shaft 75. The support arms 74, as the rotary shaft 75 rotates, swing to rise or collapse.

The wipe ascent/descent motor 76 is provided outside the carriage 71 (here, on its downstream side in the sheet conveying direction). The wipe ascent/descent motor 76 includes a gear train (not shown) composed of an output shaft and a plurality of gears. The gear train of the wipe ascent/descent motor 76 is engaged (not shown) with the rotary shaft 75. As the output shaft of the wipe ascent/descent motor 76 rotates forward, the rotation is transmitted via the gear train to the rotary shaft 75. When, with the support arms 74 collapsed (the state in FIG. 8), the rotary shaft 75 rotates forward, the support arms 74 swing to rise (the state in FIG. 9). With the support arms 74 rising and collapsing, the maintenance unit 19 ascends and descends.

As shown in FIGS. 8 and 9, the guide groove 71*b* is formed so as to extend in the up-down direction in the inner (in the sheet width direction) surface of, of the pair of side walls 78 of the carriage 71, the other wall (here, the arrow C' side wall). On opposite end parts of the maintenance unit 19 in the sheet width direction, guide projections (not shown) that project inward of the guide groove 71*b* are provided. When the maintenance unit 19 ascends and descends, the guide projections remain in contact with the inner surface of the guide grooves 71*b* so that the maintenance unit 19 is guided in the up-down direction while its movement in the sheet conveying direction is restricted.

Figure 10:
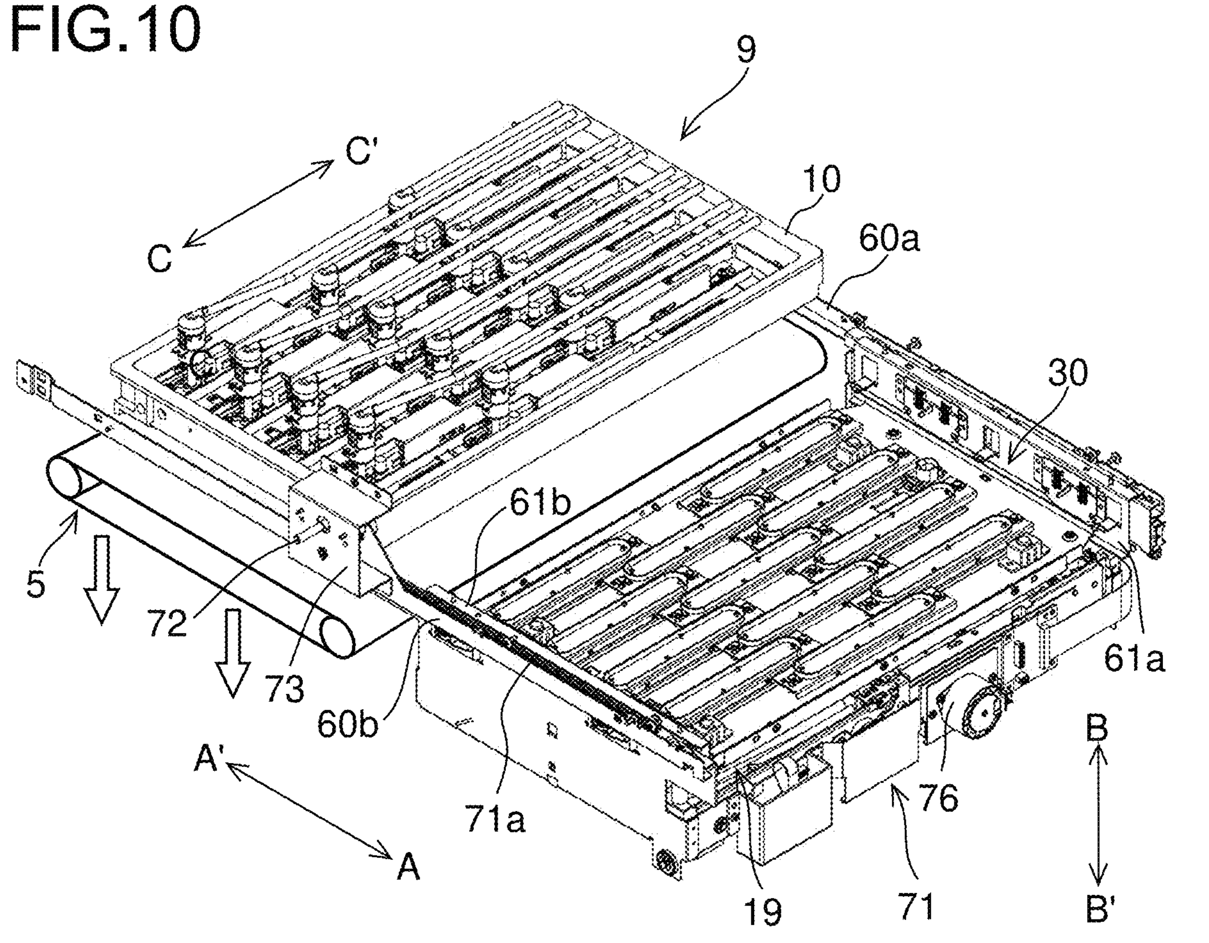
FIG. 10 is a diagram showing a state where the first belt conveying portion 5 in the printer 100 is lowered.
Figure 11:
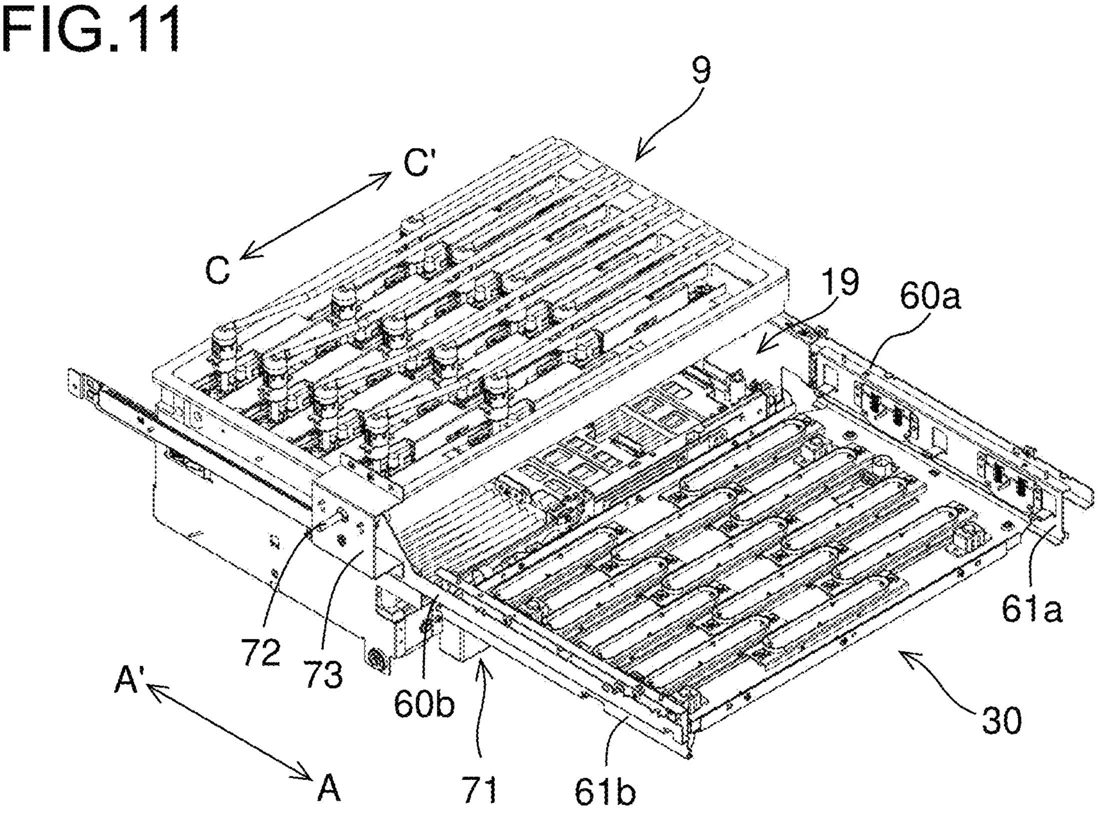
FIG. 11 is a diagram showing a state where the maintenance unit 19 in the printer 100 has moved to a facing position.
Figure 12:
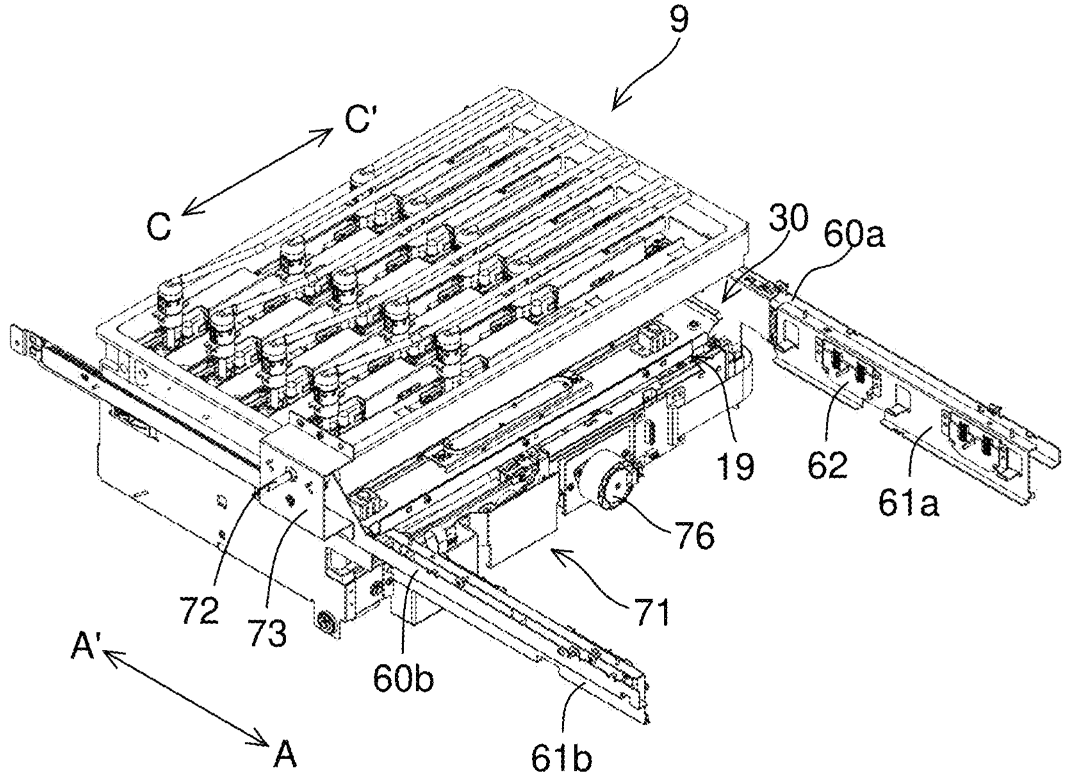
FIG. 12 is a diagram showing a state where the cap unit 30 and the maintenance unit 19 in the printer 100 have moved to the facing position.

When the cap unit 30 is attached to the recording heads 17*a* to 17*c*, first, as indicated by hollow arrows in FIG. 10, the first belt conveying portion 5 is lowered. Then, as shown in FIG. 12, with the cap unit 30 arranged on the maintenance unit 19, the maintenance unit 19 and the cap unit 30 are moved from the retracted position to the facing position with the unit horizontal-movement mechanism 65. Then, with the unit ascent/descent mechanism 66, the maintenance unit 19 and the cap unit 30 are raised so that the cap unit 30 (cap portions 30*b*) is attached to the recording heads 17*a* to 17*c*.

Figure 13:
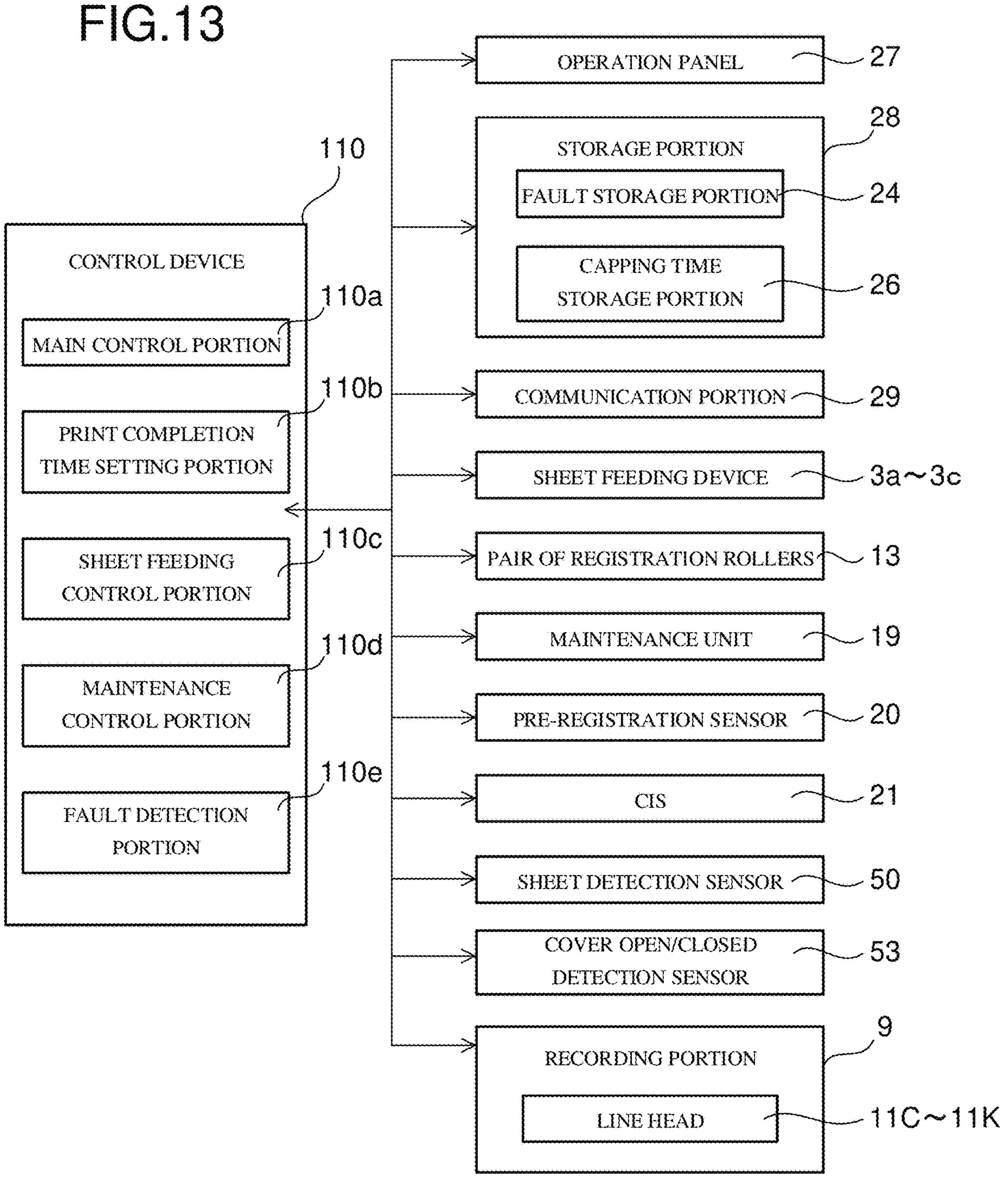
FIG. 13 is a block diagram showing one example of control paths in the printer 100 of the embodiment.

FIG. 13 is a block diagram showing one example of control paths in the printer 100 of this embodiment. The printer 100, in addition to the components described above, further includes a control device 110 (control portion), an operation panel 27 (an input portion, a display portion), a storage portion 28, and a communication portion 29.

The control device 110 is configured to include, for example, a CPU (central processing unit) and a memory. Specifically, the control device 110 includes a main control portion 110*a*, a print completion time setting portion 110*b*, a sheet feeding control portion 110*c*, a maintenance control portion 110*d*, and a fault detection portion 110*e*.

The main control portion 110*a* controls the operation of different parts of the printer 100. For example, the driving of the rollers inside the printer 100 and the ejection of ink from the line heads 11C to 11K during image recording are controlled by the main control portion 110*a*. The main control portion 110*a* further includes a counting portion for counting time and a time setting portion for setting the hour (neither is shown), and stores the settings of time and hours in the storage portion 28. The main control portion 110*a* counts the time between one incidence of ink ejection and the next.

The print completion time setting portion 110*b* sets a theoretical printing completion time at the start of printing. The theoretical printing completion time is calculated based on size information on the sheet P entered from the operation panel 27, which will be described later, printing time based on the number of sheets to be printed, maintenance time needed for calibration for density correction, flushing (purging) for suppressing ink ejection failure in the line heads 11C to 11K, purging by the maintenance unit 19 and the like, and user response time needed for replenishment with sheets P or switching of sheet feeding trays.

The sheet feeding control portion 110*c* controls the pair of registration rollers 13 and the sheet feeding devices 3*a* to 3*b*. For example, the sheet feeding control portion 110*c* controls the pair of registration rollers 13 based on the timing at which the CIS 21 senses the rear end of the sheet P to control the conveying timing of the subsequent sheet P.

The maintenance control portion 110*d* controls to have the above-mentioned purging performed in which ink is forcibly pushed out of the ink ejection nozzles 18 in the recording heads constituting the line heads 11C to 11K. The maintenance control portion 110*d* also controls the driving of the unit horizontal-movement mechanism 65 and the unit ascent/descent mechanism 66 described above. When the ink ejection time described above reaches a predetermined time (for example, one minute), the maintenance control portion 110*d* performs an operation to attach the cap unit 30 to the recording heads 17*a* to 17*c* (hereinafter referred to as "capping operation"). The timing at which the ink ejection time reaches a predetermined time is referred to as the cap closing timing.

Here, if, for example, a sheet P jams around the recording portion 9 during printing and the capping operation is executed in this state, the sheet P is caught between the cap unit 30 and the recording heads 17*a* to 17*c*. This may cause the recording heads 17*a* to 17*c* to be scratched or soiled, the cap unit 30 to be deformed, or the sheet P to tear, making it difficult to clear the sheet jam. Thus, if, at the cap closing timing, based on the detection result from the sheet detection sensor 50, it is judged that the sheet P is stuck around the recording portion 9, the maintenance control portion 110*d* stops executing the capping operation.

With the main body cover 51 open, the unit horizontal-movement mechanism 65 and the unit ascent/descent mechanism 66 are disconnected from a power supply. Thus, with the main body cover 51 open, even at the cap closing timing, the maintenance control portion 110*d* stops executing the capping operation.

The fault detection portion 110*e* can detect a movement inhibiting factor based on the status of the devices and sensors in the printer 100. The movement inhibiting factor is a factor that interferes with the movement of the cap unit 30 to the second position. For example, the movement inhibiting factors can be a jam of the sheet P around the recording portion 9 as described above or an open state of the main body cover 51. Other examples include a case where the capping operation cannot be performed for some reason, a case where a user has intentionally stopped the execution of the capping operation, a case where the main control portion 110*a* has decided to suspend the capping operation based on the status of the devices in the printer 100, and the like.

The operation panel 27 is an operation portion (input portion) for receiving input of various settings. For example, a user can operate the operation panel 27 to enter size information on the sheets P to be set in the sheet feeding cassettes 2*a* and 2*b* or on the manual feed tray 2*c*. The user can also operate the operation panel 27 to enter the number of sheets P to be printed or enter an instruction to start a printing job. The operation panel 27 functions also as a notification device (display portion) for displaying notifications related to the operation status of the printer 100.

The storage portion 28 is a memory for storing an operation program for the control device 110 along with various kinds of information and is configured to include a ROM (read-only memory), a RAM (random-access memory), and a non-volatile memory. Information set on the operation panel 27 is stored in the storage portion 28.

The storage portion 28 includes a capping time storage portion 26 and a fault storage portion 24. The capping time storage portion 26 stores a cap closure time. The cap closure time is a cumulative time of periods during which the cap unit 30 has been attached to the recording heads 17*a* to 17*c*. More specifically, the cap closure time is the cumulative time of periods after the cap unit 30 is attached to the recording heads 17*a* to 17*c* at the cap closing timing until the cap unit 30 is separated from the recording heads 17*a* to 17*c* for subsequent ink ejection.

The fault storage portion 24 stores information related to various faults that occur in the printer 100 (hereinafter referred to as "fault information"). Fault information includes the movement inhibiting factor described above, the time and frequency of occurrence of the movement inhibiting factor, a cap unmovable time, described later, and the difference value between the cap closure time and the cap unmovable time.

The cap unmovable time refers to the time, as observed on occurrence of a movement inhibiting factor described above at the cap closing timing, from the occurrence of the movement inhibiting factor until its elimination. Here is one example of the cap unmovable time. As described above, when the main body cover 51 is open, based on the detection result from the cover open/closed detection sensor 53, the fault detection portion 110*e* detects occurrence of a movement inhibiting factor. When the main body cover 51 is closed, based on the detection result from the cover open/closed detection sensor 53, the fault detection portion 110*e* detects that the movement inhibiting factor has been eliminated. The time after the timing that occurrence of a movement inhibiting factor is detected (the timing that the main body cover 51 is detected to be open) until the timing that the movement inhibiting factor is eliminated (the timing that the main body cover 51 is closed) is one example of the cap unmovable time.

Here is another example of the cap unmovable time. When a sheet P jams around the recording portion 9 during printing, the fault detection portion 110*e* detects occurrence of a movement inhibiting factor based on the detection result from the sheet detection sensor 50. The time after the timing that occurrence of a movement inhibiting factor is detected (the timing that a jam of the sheet P is detected) until the timing that the movement inhibiting factor is eliminated (the timing that the sheet P is removed) also is an example of the cap unmovable time.

The main control portion 110*a* calculates the difference value by subtracting the cap unmovable time from the cap closure time. The difference value is stored as fault information in the fault storage portion 24. The difference value represents the time during which the cap unit 30 could not be attached due to occurrence of a movement inhibiting factor relative to the time during which the cap unit 30 was supposed to be kept attached to the recording heads 17*a* to 17*c*.

The main control portion 110*a* can execute a measurement mode. An instruction to start and end the measurement mode is directly entered by a user on the operation panel 27. If, while the measurement mode is executed, a movement inhibiting factor occurs, the main control portion 110*a* stores in the fault storage portion 24 fault information including the movement inhibiting factor. If an instruction to end the measurement mode is entered on the operation panel 27, the fault information stored in the storage portion 28 is displayed on the operation panel 27.

The measurement mode can be started at the beginning of or in the middle of printing, and can be ended in the middle of or at the completion of printing. It is also possible to make a setting previously so that the measurement mode is executed during a predetermined time period. An example of control in the measurement mode will be described in detail later.

The communication portion 29 is a communication interface for transmitting and receiving information to and from an external device (for example, a personal computer (PC)). For example, when a user operates a PC and transmits to the printer 100 a print command together with image data, the image data and print command are fed to the printer 100 via the communication portion 29. In the printer 100, the main control portion 110*a* can control the recording heads 17*a* to 17*c* based on the image data to make them eject ink and thereby record an image on a sheet P.

Figure 14:
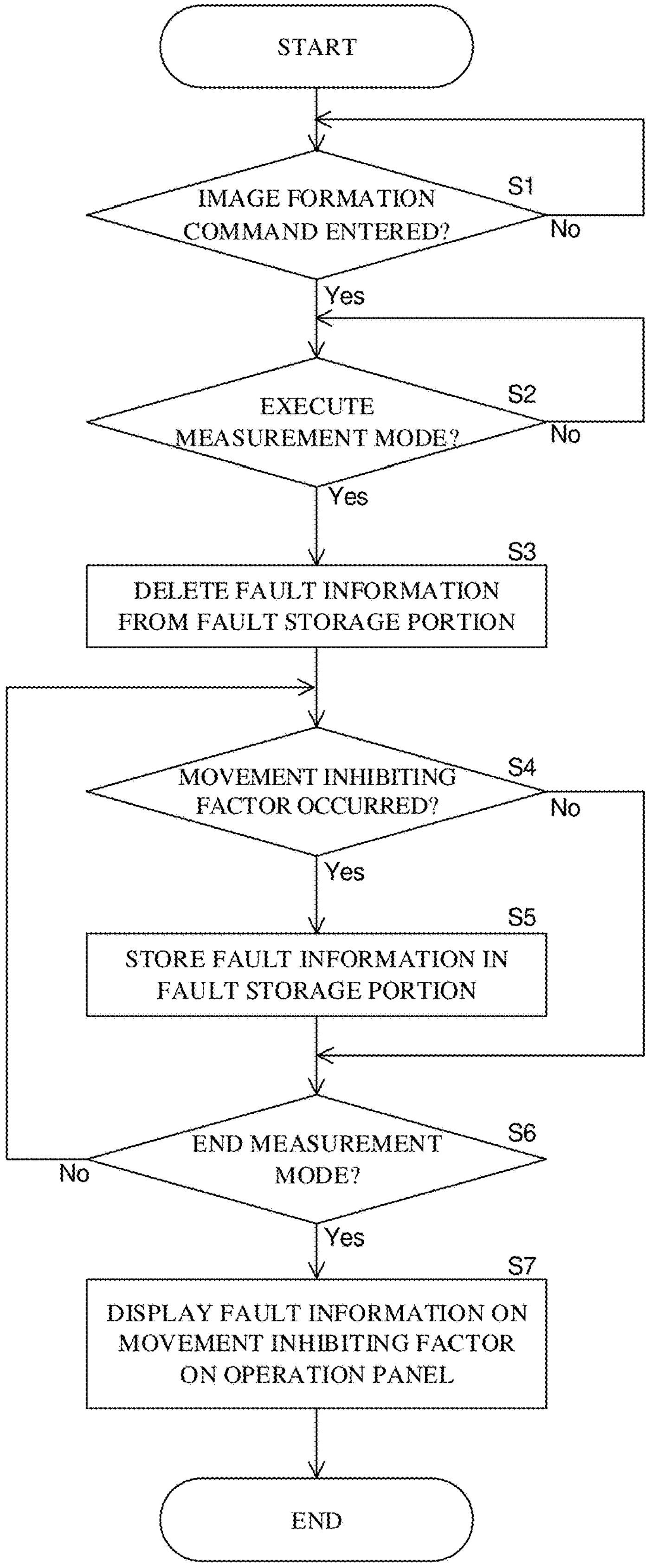
FIG. 14 is a flow chart showing one example of the control procedure in a measurement mode.

Next, an example of control in the measurement mode described above will be explained with reference to the flowchart shown in FIG. 14. FIG. 14 is a flow chart showing one example of the control procedure in the measurement mode.

As shown in FIG. 14, the main control portion 110*a* checks whether an image formation command has been entered from a host device such as a personal computer (step S1). So long as no image formation command is entered (No in step S1), an image-formation standby state is maintained until an image formation command is entered.

If an image formation command is entered (Yes in step S1), the main control portion 110*a* starts image formation and in addition checks whether an instruction to execute the measurement mode has been entered (step S2). So long as no instruction to execute the measurement mode is entered (No in step S2), while image formation is continued, a measurement-mode standby state is maintained until an instruction to execute the measurement mode is entered.

If an instruction to execute the measurement mode is entered (Yes in step S2), fault information stored in the fault storage portion 24 is deleted (step S3). Next, whether a movement inhibiting factor has occurred during image formation is checked (step S4). If a movement inhibiting factor has occurred (Yes in step S4), fault information related to the movement inhibiting factor (information including the movement inhibiting factor, the occurrence time of the cap movement inhibiting factor, and the difference value between the cap closure time and the cap unmovable time) is stored in the fault storage portion 24 (step S5). If no movement inhibiting factor has occurred (No in step S4), the procedure skips step S5 and proceeds to step S6.

Next, whether an instruction to end the measurement mode has been entered is checked (step S6). If an instruction to end the measurement mode has been entered (Yes in step S6), the fault information stored in the fault storage portion 24 is displayed on the operation panel 27 (step S7), and the control in the measurement mode ends. So long as no instruction to end the measurement mode is entered (No in step S6), the procedure returns to step S4, and step S4 to step S6 are repeated until an instruction to end the measurement mode is entered.

If, between steps S4 and S6, fault information is repeatedly stored, the cap unmovable time and the difference value described above are stored in a cumulative manner with respect to the already-stored times. Specifically, after a cap unmovable time is stored in step S5, if no instruction to end the measurement mode is entered (No in step S6) and, again in step S5, another cap unmovable time due to a different movement inhibiting factor is stored, the main control portion 110*a* calculates the cumulative time by adding the latest cap unmovable time to the previously stored cap unmovable time, and stores the cumulative time in the fault storage portion 24. The main control portion 110*a* calculates the difference value described above using the cumulative time of the cap unmovable time as the cap unmovable time and stores the result in the fault storage portion 24.

As described above, the printer 100 according to the embodiment can detect occurrence of a movement inhibiting factor and store fault information in the fault storage portion 24. A user can, based on the fault information stored in the fault storage portion 24, perform maintenance of the printer 100 or review the operation sequence and the print settings on the printer 100. In this way, it is possible to suppress occurrence of movement inhibiting factors and to reduce the frequency of execution of purging. Thus, it is possible to provide a printer 100 that can suppress a drop in productivity.

If the printer 100 is used for what is called business purposes such as in a case where printing is performed on thousands of sheets in a single print job, the user operating the printer 100 is often skilled and knowledgeable about printing. Such a skilled user may be interested to monitor occurrence of movement inhibiting factors in a certain time zone out of the long period of printing. To cope with this, the printer 100 according to the above embodiment can execute and terminate the measurement mode through operation on the operation panel 27 as described above. Thus, the user can obtain information on the movement inhibiting factors that occur during a given period (time zone).

As described above, the fault information stored in the fault storage portion 24 includes the cap unmovable time. In this way, a user can recognize the time during which a movement inhibiting factor has occurred. As described above, the printer 100 according to the embodiment stores the cap closure time in the storage portion 28, and in addition calculates the difference value between the cap closure time and the cap unmovable time to store the result as fault information in the fault storage portion 24. In this way, the user can recognize the time during which the cap unit 30 could not be attached due to occurrence of a movement inhibiting factor relative to the time during which the cap unit 30 was supposed to be kept attached to the recording heads 17*a* to 17*c*. Thus, the user can guess the dryness of the ejection nozzles 18 and the timing of purging and perform maintenance on the printer 100, and this helps suppress a drop in productivity.

As described above, the fault information includes the frequency of occurrence of the movement inhibiting factor. Thus, a user can recognize the frequency of occurrence of the movement inhibiting factor and take appropriate measures (such as reviewing the operation sequence and the print settings on the printer 100 and performing maintenance on the printer 100) to suppress occurrence of the movement obstruction factor. As described above, the fault information includes the time of occurrence of the movement inhibiting factor. Thus, it is possible to recognize the timing of occurrence of the movement inhibiting factor.

The embodiment described above is in no way meant to limit the present disclosure, which thus allows for many modifications and variations within the spirit of the present disclosure. For example, movement inhibiting factors may be previously stored in the storage portion 28, or the fault detection portion 110*e* and the main control portion 110*a* may be configured to identify them based on the operation state of the printer 100.

While, in the above description, a photo sensor of an optical type is employed as the cover open/closed detection sensor 53, it can instead be a mechanical button or switch that can detect the open/closed state of the main cover 51.

While, in the embodiment described above, the sheet detection sensor 50 detects the presence of a sheet P between the recording portion 9 and the first conveying belt 8, it is also possible to adopt a configuration where, instead of the sheet detection sensor 50, the CIS 21 detects the presence of a sheet P between the recording portion 9 and the first conveying belt 8.

The present invention is applicable to image forming apparatuses which form an image on a recording medium by ink-jet recording and in which a cap is attached to a recording head at intermissions during printing. Based on the present invention, in the event of an increase in the frequency of purging or in the amount of ink used for purging, a user can obtain information (fault information) on the factor (movement inhibiting factor) that is preventing the cap from being attached to the recording head. This makes it easier to suppress occurrence of the movement inhibiting factor and makes it possible to provide an image forming apparatus that can suppress a drop in productivity.

The invention claimed is:

1. An ink-jet recording apparatus comprising:

a conveying portion that conveys a recording medium;

a recording head that has an ink ejection face from which ink is ejected, the recording head ejecting the ink from the ink ejection face to the recording medium conveyed by the conveying portion to perform printing;

a cap member that is removably attached to the ink ejection face, the cap member protecting the ink ejection face;

a cap moving mechanism with which the cap member is movable between a first position at which the cap member is away from the ink ejection face and a second position at which the cap member is attached to the ink ejection face; and a control portion that controls the cap moving mechanism so that, at a cap closing timing that occurs a predetermined time after previous ink ejection from the ink ejection face but before subsequent ink ejection, the cap member is moved from the first position to the second position, wherein the ink-jet recording apparatus further includes:

a fault detection portion that can detect occurrence of a movement inhibiting factor that inhibits movement of the cap member to the second position;

a storage portion that can store fault information including the movement inhibiting factor, and a recording medium detection sensor that can detect presence of the recording medium, the recording medium detection sensor being arranged in the conveying portion, at a facing position where the recording medium faces the ink ejection face, the control portion can execute a measurement mode in which, based on a detection result from the fault detection portion, the fault information is stored in the storage portion, and when the recording medium is at the facing position at the cap closing timing, the fault detection portion detects as the movement inhibiting factor a detection result from the recording medium detection sensor.

2. The ink-jet recording apparatus according to claim 1, further comprising:

an input portion on which an instruction to execute or terminate the measurement mode is entered; and a display portion that displays the fault information, wherein the control portion, when an instruction to execute the measurement mode is entered, deletes the fault information stored in the storage portion and stores in the storage portion the fault information that has occurred during subsequent printing, and when an instruction to terminate the measurement mode is entered, displays the fault information stored in the storage portion.

3. The ink-jet recording apparatus according to claim 1, wherein when the recording medium is at the facing position at the cap closing timing, the fault detection portion detects as the movement inhibiting factor a detection result from the recording medium detection sensor, and based on a detection result from the fault detection portion, the control portion stops movement of the cap member to the second position.

4. The ink-jet recording apparatus according to claim 1, further comprising:

an apparatus main body that has therein the recording head and the cap moving mechanism;

an access cover that is provided on the apparatus main body and that exposes and closes an inside of the apparatus main body; and a cover open/closed detection sensor that can detect a state where the access cover is open, wherein when the cover open/closed detection sensor detects that the access cover is open at the cap closing timing, the fault detection portion detects a detection result from the cover open/closed detection sensor as the movement inhibiting factor.

5. The ink-jet recording apparatus according to claim 1, wherein when the movement inhibiting factor occurs at the cap closing timing, the control portion stores in the storage portion a length of time after the movement inhibiting factor has occurred until the movement inhibiting factor is eliminated as a cap unmovable time, and the fault information includes the cap unmovable time.

6. The ink-jet recording apparatus according to claim 5, wherein the control portion stores in the storage portion a cap closure time which is a length of time after the cap closing timing until the ink is subsequently ejected from the ink ejection face, and calculates and stores in the storage portion a difference value between the cap closure time and the cap unmovable time, and the fault information includes the difference value.

7. The ink-jet recording apparatus according to claim 1, wherein the control portion stores a cap unmovable frequency, which is a number of times that the movement inhibiting factor has occurred at the cap closing timing, and the fault information includes the cap unmovable frequency.

* * * * *